(12) United States Patent
Isaacs et al.

(10) Patent No.: US 6,760,754 B1
(45) Date of Patent: Jul. 6, 2004

(54) SYSTEM, METHOD AND APPARATUS FOR COMMUNICATING VIA SOUND MESSAGES AND PERSONAL SOUND IDENTIFIERS

(75) Inventors: Ellen Isaacs, Belmont, CA (US); Alan Walendowski, Belmont, CA (US)

(73) Assignee: AT&T Corp., New York, NY (US)

( * ) Notice: Subject to any disclaimer, the term of this patent is extended or adjusted under 35 U.S.C. 154(b) by 753 days.

(21) Appl. No.: 09/609,893

(22) Filed: Jul. 5, 2000

Related U.S. Application Data

(60) Provisional application No. 60/184,180, filed on Feb. 22, 2000.

(51) Int. Cl.[7] ............................. G06F 15/16; G09G 5/00
(52) U.S. Cl. ...................... 709/206; 345/727; 345/753; 345/758
(58) Field of Search .................. 709/206; 345/727–729, 345/751–753, 758, 864–865

(56) References Cited

U.S. PATENT DOCUMENTS

| | | | | |
|---|---|---|---|---|
| 5,826,064 A | * | 10/1998 | Loring et al. .................. | 703/24 |
| 6,026,156 A | | 2/2000 | Epler et al. | |
| 6,229,880 B1 | | 5/2001 | Reformato et al. | |
| 6,252,588 B1 | * | 6/2001 | Dawson ....................... | 345/752 |
| 6,349,327 B1 | * | 2/2002 | Tang et al. .................. | 709/205 |
| 6,397,184 B1 | | 5/2002 | Walker | |
| 6,427,064 B1 | * | 7/2002 | Henderson ................... | 340/5.1 |
| 6,510,452 B1 | * | 1/2003 | Brisebois et al. ............ | 709/204 |
| 6,519,771 B1 | * | 2/2003 | Zenith ......................... | 725/32 |
| 6,574,604 B1 | * | 6/2003 | van Rijn ....................... | 705/1 |
| 2002/0026483 A1 | * | 2/2002 | Isaacs et al. ................ | 709/206 |
| 2002/0034281 A1 | * | 3/2002 | Isaacs et al. ............. | 379/88.12 |
| 2002/0059144 A1 | | 5/2002 | Meffert et al. | |
| 2002/0116275 A1 | * | 8/2002 | Woolston ..................... | 705/26 |
| 2003/0007625 A1 | | 1/2003 | Pines et al. | |

OTHER PUBLICATIONS

The Multimodal Interaction Group's Publications, www.dcs.gla.ac.uk/~stephen/publications.shtml, pp. 1–9, Jul. 31, 2003.*

The Sound and the Fury, St. Petersburg Times, www.sptimes.com/News/91399/Technology/The_sound_and_the_fur.shtml, pp 1–6, Sep. 13, 1999.*

Isaacs, E., Hubbub: A Sound–Enhanced Mobile Instant Messenger That Supports Awareness and Opportunistic Interactions, CHI 2002, ACM, pp. 179–186, Apr. 20–25.*

\* cited by examiner

*Primary Examiner*—Andrew Caldwell

(57) ABSTRACT

A system, method and apparatus for facilitating communication among a number of distributed clients in a distributed network is disclosed. A user, such as through a personal digital assistant device, may select one or more sound messages for transmission to one or more other users in the network. Each sound message may be preceded by a sound identifier which identifies the sending user. Users may select or create their sounds message and/or person sound identifiers. The sound messages will typically be abbreviated melodies or note strings which are associated with certain conversational messages.

23 Claims, 5 Drawing Sheets

SYSTEM, METHOD AND APPARATUS FOR COMMUNICATING VIA SOUND MESSAGES AND PERSONAL SOUND IDENTIFIERS

This application claims the benefit of U.S. provisional application No. 60/184,180 filed Feb. 22, 2000.

BACKGROUND OF THE INVENTION

This invention relates to interactive communications, and more particularly, to a system, method and apparatus for communicating in a distributed network via sound instant messages and personal sound identifiers.

One of the more beneficial aspects of the Internet, aside from the vast array of information and content sources it provides, is the varied and newfound ways people can now communicate and stay in touch with one another. Users all around the world, or even just around the corner, may now communicate in a relatively low cost and efficient manner via a myriad of Internet facilities including electronic mail, chat rooms, message boards, text based instant messaging and video tele-conferencing.

These methods of communication offer distinct advantages over standard communicative methods such as paper based mail and conventional telephone calls. For example, facilities like electronic mail are typically considerable faster and cheaper than these conventional methods of communication. Rapidly escalating in popularity is text based instant messaging which offers more instantaneous gratification with respect to interactive communications between two or more users.

However, one main problem with presently available forms of text based instant messaging and facilities like electronic mail is that both text based instant messaging and electronic mail are still both somewhat impersonal, especially compared with something like conventional telephone conversations where vocal intonation, tone and feedback provide a much needed flavor of humanity and personality to the communications. Text based instant messaging and electronic mail also typically require the users to have access to input devices such as keyboards to facilitate the creation and transmission of messages to one user from another. The quality of such communications thus depends heavily on each user's typing speed, accuracy and network connection quality of service. Furthermore, users without access to input devices such as keyboards may find it very difficult to conduct meaningful conversations without have to endure tedious keystroke input procedures.

Accordingly, it would be desirable to have a way to communicate with other users in still an efficient and quick manner but with a more personal touch than provided by other modes of electronic based communications.

SUMMARY OF THE INVENTION

The present invention is a system, method and apparatus for facilitating communications among a number of distributed users who can send and receive short sound earcons or sound message which are associated with specific conversational messages. The earcons are typically melodies made up of short strings of notes. Users conversing with one another via the earcons are responsible for learning the meaning of each earcon in order to effectively communicate via the earcons. Visual aids may be provided to aid users in learning the meaning of the earcons.

In one embodiment of the present invention, the earcons are represented via visual icons on their respective communicative devices, such as their personal digital assistant devices, personal computers and/or wireless telephones. One embodiment of the present invention is a system for facilitating communication among a plurality of distributed users. The system includes a plurality of distributed communicative devices, a plurality of sound instant messages for playing on each of the distributed communicative devices and a central server which receives a request from one or more of the plurality of distributed communicative devices, transmits the request to one or more of the plurality of distributed communicative devices identified in the request wherein the one or more of the plurality of distributed communicative devices identified in the request will play the one or more of the plurality of sound instant messages also identified in the request.

The present invention is also an apparatus for facilitating distributed communications between a plurality of remote users which includes a display screen, at least one icon displayed on the display screen, the at least one visual icon associated with an earcon made up of a series of notes associated with a communicative message, and a transmitter for transmitting the earcon from the first user to at least one other user.

The present invention also is a method for communicating via sound instant messages which includes receiving one or more sound instant messages, caching the plurality of sound instant messages, receiving a request to play at least one of the cached sound instant messages and playing the at least one of the received sound instant messages from the plurality of cached sound instant messages.

The present invention further includes a method of establishing sound based communications among a plurality of distributed users in a communicative network which includes determining which of the plurality of distributed users are currently on the network, receiving a request from at least one user on the network, wherein the request identifies one or more users in the network and at least one sound instant message designated for the one or more identified users and transmitting the one or more sound instant messages to the one or more identified users in the network.

In the present invention, personal sound identifiers may accompany a sound message or earcon such that the receiving user will be alerted to the identity of the user who sent them the sound message or earcon. The earcons are typically short snippets of song riffs or some otherwise random selection of notes or sounds which are used to uniquely identify each user to one another.

DETAILED DESCRIPTION OF THE INVENTION

U.S. provisional application No. 60/184,180 filed Feb. 22, 2000 is hereby incorporated by reference herein in its entirety.

Figure 1:
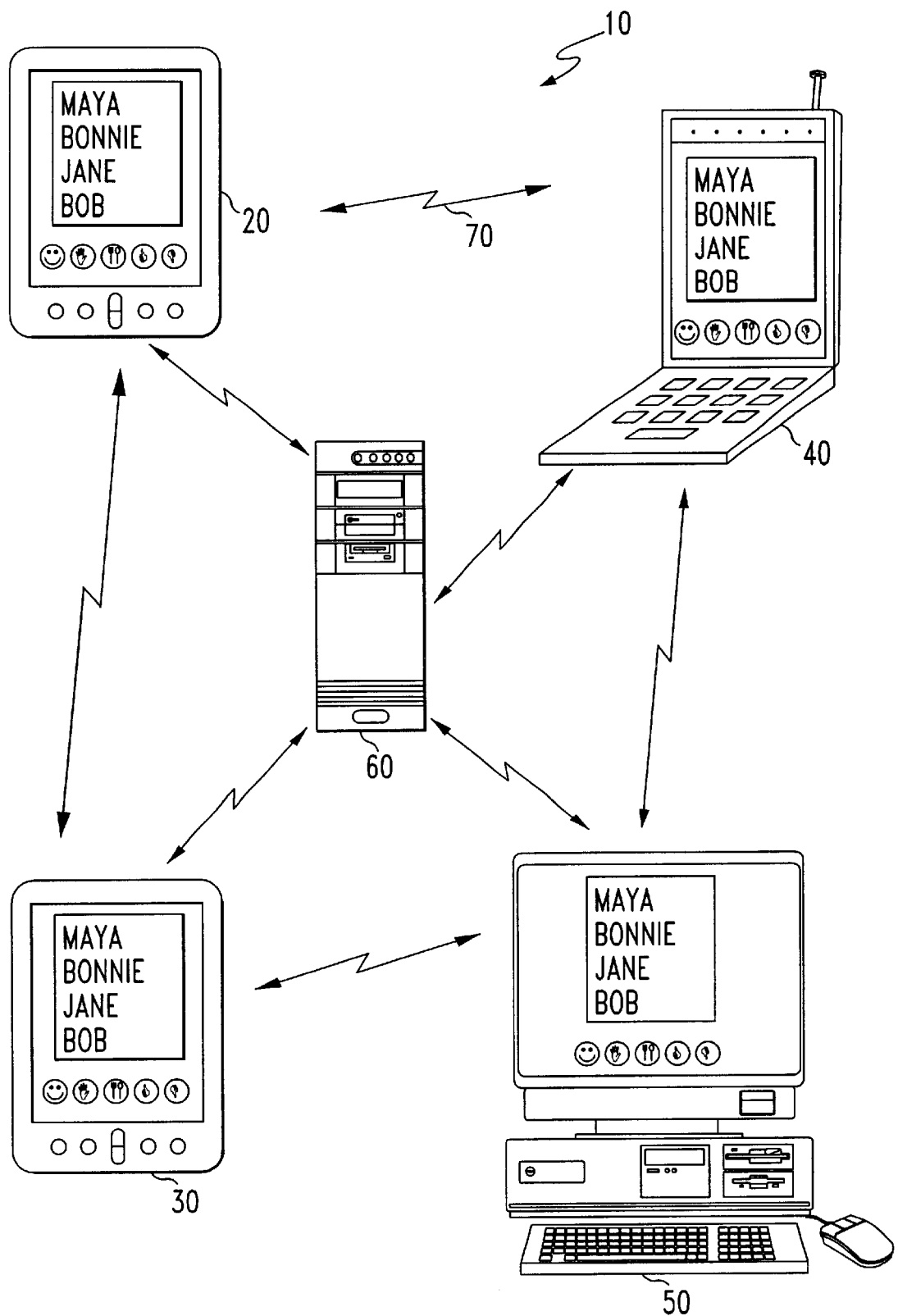
FIG. 1 is a diagram of an exemplary system in accordance with the teachings of the present invention.

Referring to FIG. 1, an exemplary communications system 10 is shown in accordance with the present invention wherein users in the system may communicate with one another using sound messages or "earcons" and/or personal sound identifiers. As used herein and described in more detail later herein, the terms "sound messages", "sound instant messages" and "earcons" which are used interchangeably herein, mean a short series of notes and/or sounds which are associated with or representative of any number of short communicative phrases. These short communicative phrase may be any conversational message such as "Hi", "Hello", "Are you ready to go?", "Meet you in five minutes", "I'm heading home" and a virtually infinite variety of these and other phrases. For example, a short string of six notes could be constructed to mean "Are you ready to go?" while another unique short string of four notes could be constructed to mean "Hello." Typically, each user will be provided with a basic "set" of conventional or standardized earcons which have predefined meanings such that users may readily communicate with one another using these standardized earcons without having to decipher or learn the meaning of the earcons. Additionally, new earcons may be created by each user such that when using these user-created earcons, each user is responsible for the task of interpreting and learning each other user's respective earcons in order to effectively communicate via the earcons or sound messages.

As used herein and described in more detail later herein, the term "personal sound identifier" refers to one or more short or abbreviated sound snippets which a user may use to identify themselves to another user. These sound snippets will typically be short melodies made up of short strings of notes which a user will use to identify themselves to other users in the system. The personal sound identifiers may also be snippets or riffs of popular songs, themes or melodies. Both the earcons and personal sound identifiers may be selected by a user from a predetermined selection or the sound messages and person sound identifiers may be created by user individually, as discussed in more detail later herein.

In one embodiment, the earcons and personal sound identifiers are used on a selective basis, whereby a user may or may not provide their personal sound identifier with each earcon sent by that user to other user(s). In another embodiment, every earcon is accompanied the user's personal sound identifier. For example, if a user's earcon is a three note melody and that user wishes to send another user an earcon which means "Are you ready to go?", the other user will hear the three note melody followed by the earcon which means "Are you ready to go?" In this manner, users can readily identify the source of the earcon which is especially valuable when multiple users are sending each other earcons during a single communicative session. Certain system rules may also be implemented regarding the playing of the personal sound identifiers. For example, if a user has received a series of earcons from a single other user, the sending user's earcon will not be played everytime since it can be assumed that the receiving user is already aware of the sending user's identity. Other rules may be implemented, for example, if a user has not received any earcons for a specified period of time, such as 15 minutes, any earcons received will automatically be preceded by the sending user's personal sound identifier.

As shown in FIG. 1, the system 10 includes one or more communicative devices, such as personal digital assistant (PDA) devices 20, 30, wireless telephone 40 and personal computer 50. In the present invention, the devices, such as personal digital assistant (PDA) devices 20, 30, wireless telephone 40 and personal computer 50 are in communication with one another and with a central server 60 via a plurality of communication transmissions 70. In one embodiment, each device is associated with an individual user or client but in other embodiments, a single user or client may be associated with two or more devices in the system.

Each device may be in communication with one another and central server 60 through a wireless and/or a wired connection such as via dedicated data lines, optical fiber, coaxial lines, a wireless network such as cellular, microwave, satellite networks and/or a public switched phone network, such as those provided by a local or regional telephone operating company. In a wireless configuration, the devices may communicate using a variety of protocols including Transmission Control Protocol/Internet Protocol (TCP/IP) and User Datagram Protocol/Internet Protocol (UDP/IP). Both the TCP/IP and/or the UDP/IP may use a protocol such as a Cellular Digital Packet Data (CDPD) or other similar protocol as an underlying data transport mechanism in such a configuration. In the present invention, one to one messaging as well as multicast messaging from one user to a group of two or more users may be implemented easily via a UDP-based protocol.

In an exemplary embodiment, the devices preferably include some type of central processor (CPU) which is coupled to one or more of the following including some Random Access Memory (RAM), Read Only Memory (ROM), an operating system (OS), a network interface, a sound playback facility and a data storage facility. In one embodiment of the present invention, a conventional personal computer or computer workstation with sufficient memory and processing capability may be used as central server 60. In one embodiment, central server 60 operates as a communication gateway, both receiving and transmitting sound communications sent to and from users in the system.

While the above embodiment describes a single computer acting as a central server, those skilled in the art will realize that the functionality can be distributed over a plurality of computers. In one embodiment, central controller 70 is configured in a distributed architecture, with two or more servers are in communication with one another over the network.

Figure 2:
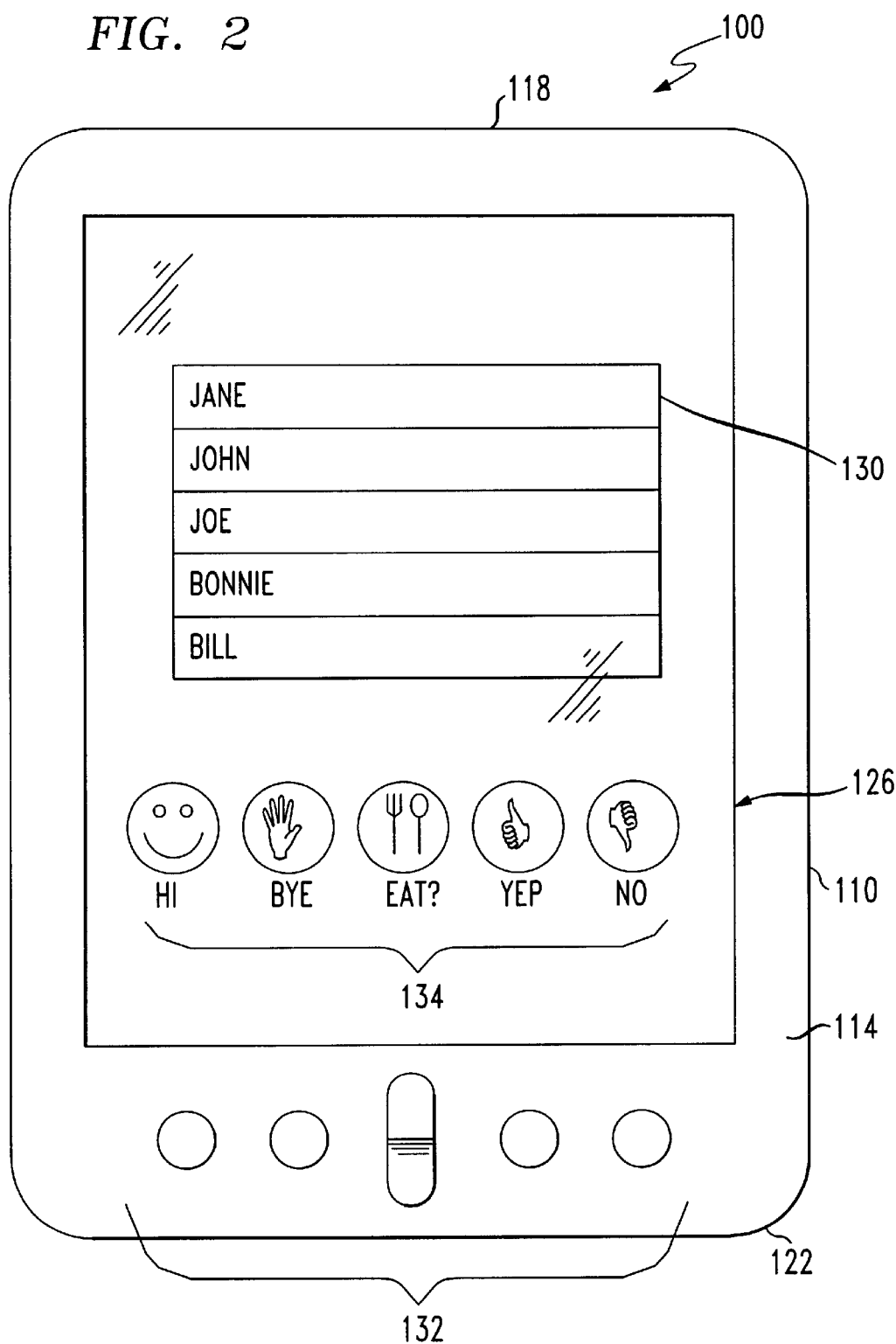
FIG. 2 is a diagram of an illustrative communicative device in accordance with the teachings of the present invention.

Referring to FIG. 2, an exemplary device for creating, storing, transmitting and receiving sound messages and/or personal sound identifiers is shown. As shown in FIG. 2, the device is a type of Personal Digital Assistant (PDA) 100. It is known that PDAs come in a variety of makes, styles, and configurations and only one out of the many makes, styles and configurations is shown. In one embodiment of the present invention, PDA 100 includes a includes a low profile box shaped case or housing 110 having a front face 114 extending from a top end 118 to a bottom end 122. Mounted or disposed within front face 114 is a display screen 126. Positioned proximate bottom end 122 are control buttons 132. Display screen 126 may be activated and responsive to a stylus, control pen, a finger, or other similar facility, not shown. Disposed within housing 110 is a processor coupled with memory such as RAM, a storage facility and a power source, such as rechargeable batteries for powering the system. The microprocessor interacts with an operating system that runs selective software depending on the intended use of PDA 12. As used in accordance with the teachings herein, memory is loaded with software code for selecting/generating, storing and communicating via sound messages and/or personal sound identifiers with one or more other users in the system.

Referring again to FIG. 2, in one embodiment, the display screen 126 includes a screen portion 130 which displays the name, screen identification or other identifying indicia one or more other users on the network. In one embodiment, a user may be able to maintain a list of users on their device and when such as user becomes active on the network, the display will provide some indication to the user, such as by highlighting the name in some manner, to indicate that the user is available on the system. For example, an icon may appear proximate to the name of a user who is available or present on the system.

As used herein, the term "available" may include both when a user is currently "active", such as when they are presently using their communicative device or the term "available" may include when a user is "idle", such as when the user is logged on but is not currently using their respective communicative device. In certain embodiments, a different icon may be used to distinguish between when a user is in an "active" or in an "idle" state. In the present invention, clients or users via their respective communicative devices such as PDAs, laptops, PCs, etc. may update a centralized server with their presence information via a lightweight UDP-based protocol. Typically, the server will fan a client's presence information out to other users or clients that have indicated an interest and have permission to see it. Thus in a case where one user may be "logged on" on two or more devices, the sound message request will be transmitted to the user on the device which is deemed to be currently in an "active" state. In the present system, users may be alerted as to the state change of other users in the system, such as when a certain user becomes "active" or changes from "active" to "idle." Such alerts may be provided via sound-based alerts which will indicate the state changes to the users. Such alerts may be followed, for example, by the user's personal sound identifier which identifies the user who has changed their respective "state."

As shown in FIG. 2, the display screen 126 includes one or more visual indicia or icons 134 which are associated with one or more sound messages, sound instant messages or earcons. For example, five different representative sound icons 134 are shown, each icon associated with a distinct sound message or earcon such as "Hi", "Bye", "Eat", "Yep" and "No". To facilitate communication via the earcons, each icon may include a textual or visual label to assist the user in remembering which icon is associate with which earcon. For example, referring to the icons 134, the "Eat" icon may includes a picture which hints as to the meaning of the earcon, such as a fork and spoon as illustrated and may also include a textual label such as "Eat?" As discussed in more detail later herein, each sound message may be user created, such as the user employing a sound creation/editing utility which the user may use to compose the earcon or the user may select from system provided earcons from which a user may make selections. Similarly, icons 134 which are associated with the earcons may be user created such as via specialized software for designing and editing bitmaps of icons and/or the icons may be provided by the system from which a user may select.

Referring again to FIG. 2, the display screen 126 may further include a visual log for recording and displaying the different sound message or earcons which a user may have received. Such a visual log may aid a user in learning the meaning of earcons for which the user is unfamiliar with.

Figure 3:
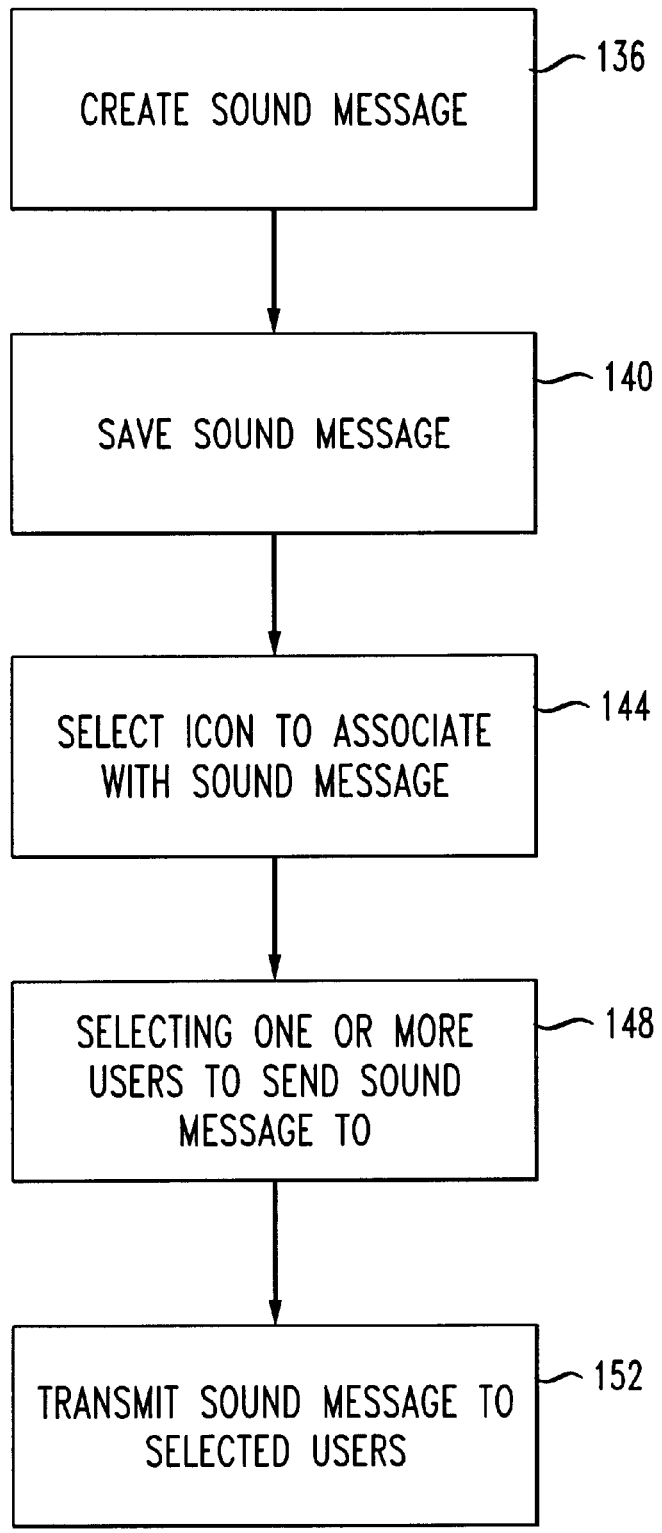
FIG. 3 is an exemplary method in accordance with the teachings of the present invention.
Figure 4:
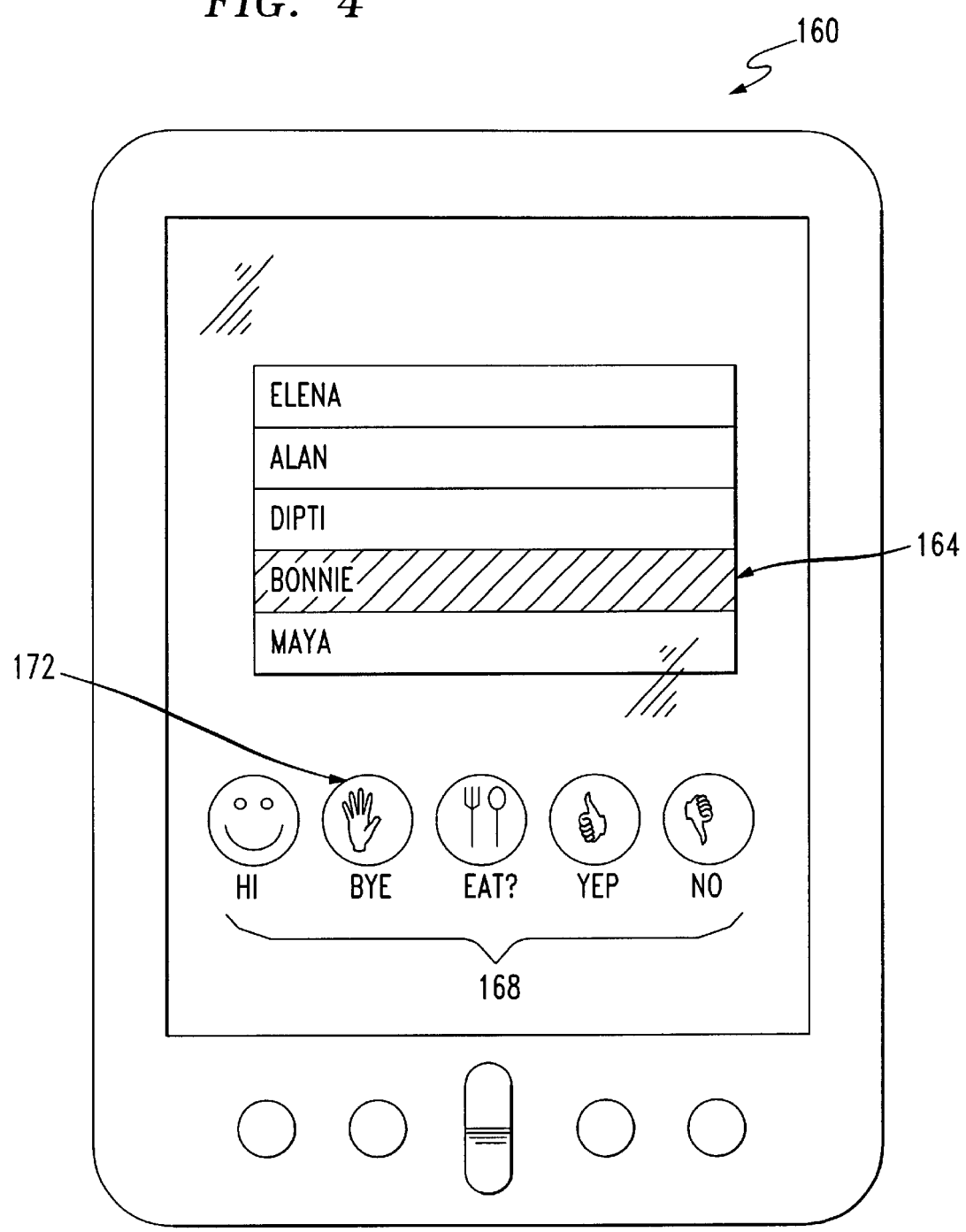
FIG. 4 is another diagram of an illustrative communicative device in accordance with the teachings of the present invention.

Referring now to FIGS. 3 and 4, an exemplary method and device is shown for creating and transmitting sound messages and/or personal sound identifiers between users in the system. As shown in FIG. 3, the user creates a sound message, step 136. A sound message may be created by simply selected a sound message from a selection of pre-recorded sound messages or sound message may be newly created by a user, such as by employing a sound editor utility to construct a sound message. Once a sound message is created, he sound message is saved, step 140. Saving may be done locally on a user's personal communicative device by simply saving the sound message with, for example, a sound editor utility as a sound file on the device's storage facility. The user may then select or create an icon to be associated with the sound message, step 144. The icon may be selected from a selection of already existing icons or may be specially created by the user via a graphics utility or facility. In other embodiments, an icon may be assigned to the sound message automatically. Once an icon is selected/created and is now associated with a specific sound message, the user may send the sound message to any number of users in the system. To accomplish this, the user may select one or more users to send the sound message to, step 148. This may be accomplished, as discussed in more detail later herein, such as by selecting one or more user names from a directory of users. The user may then transmit the sound message to the selected users by selecting or activating the icon associated with the desired sound message, step 152.

As discussed in more detail later herein, typically the file in which the sound message or earcon is stored is not itself transmitted to users directly. Preferably, each user already has a "copy" of the sound message stored or cached locally such that only a request or command to play the sound message is transmitted by the user. However, in cases where a user just created a new sound message, the sound message would first need to be distributed to the other users in the system. Preferably this is accomplished on "as-needed" basis whereby the new sound message is transferred "on-the-fly" to users who does not yet have a stored or cached version of the new sound message. For example, the user who has created the new sound message will simply send the sound message like any other sound message at which point the receiving user who does not yet have the sound message will request transfer of the new sound message.

In other embodiments, the proliferation and distribution of sound messages or earcons may be accomplished by having specialized software automatically distribute a new sound message to the other users when the software detects that new message has been created. In another embodiment, a central repository of sound messages or earcons may be administered via a central server, such as illustrated in FIG. 1. In this embodiment, the central server would maintain a central repository of all sound messages or earcons in the system and would periodically update user's devices with the earcons as new one were created. Similar methods may be used to delete sound messages or earcons which are obsolete or unwanted.

In the present invention, as new sound messages or earcons are created, each sound message is assigned a unique identifier, which can be a numerical identification (ID), alphabetical ID, a combination thereof or other unique identifier which is unique to that particular sound message. In this manner, sound messages or earcons are identified within the system between users via these unique identifiers.

In one embodiment of the present invention, the files containing the sound messages or earcons are stored locally on each user's local device such as their PDA. Sound messages may be stored as sound files in any one or other file formats such as in a MIDI file format, a .MP3 file format, a .WAV file format, a .RAM file format, .AAC file format and a .AU file format.

Referring now to FIG. 4, an exemplary device 160 for implementing the steps as discussed above and shown in FIG. 3 is shown. In this embodiment, a user may send one or more other users a sound message or earcon as follows. The user employing the device 160 makes a selection from a screen portion 164 which lists some identifying indicia, such as the names of system users, shown herein "Elena, Alan, Dipti, Bonnie and Maya." In an exemplary embodiment, one user say for example, "Elena", selects "Bonnie", by selecting via a stylus, not shown, the name "Bonnie" which is then subsequently highlighted. The user then taps or selects the appropriate icon from the selection of icons 168 which is associated with the sound message or earcon the user wishes to send to "Bonnie." For example, if the user wishes to send the sound message "BYE" to "Bonnie" the user will simply select the icon "BYE" 172 which will transmit the associated earcon to "Bonnie", or more specifically a command or request will be transmitted to "Bonnie" to play the earcons associated with icon 172. "Bonnie's" respective device will then undertake playing the sound message, such as via a sound playback facility which may include a sound processor and a speaker component. In one embodiment, only the "BYE" earcon is played on "Bonnie's" device and in other embodiments, the "BYE" earcon is accompanied by "Elena's" personal sound identifier. Thus, if "Bonnie" did not already know that the earcon originated from "Elena", "Elena" personal sound identifier should provide "Bonnie" with this information. Typically, the personal sound identifier will be played before playing the earcon but the personal sound identifier may also be played after the earcon is played. In the present invention, it is contemplated that a user may send another user a series of sound message by multiply selecting two or more earcons to send to the user. In this manner, a user may actually construct phrases or sentences with a variety of independent earcons strung together. A user may also send the same earcon to multiple users simultaneously.

Figure 5:
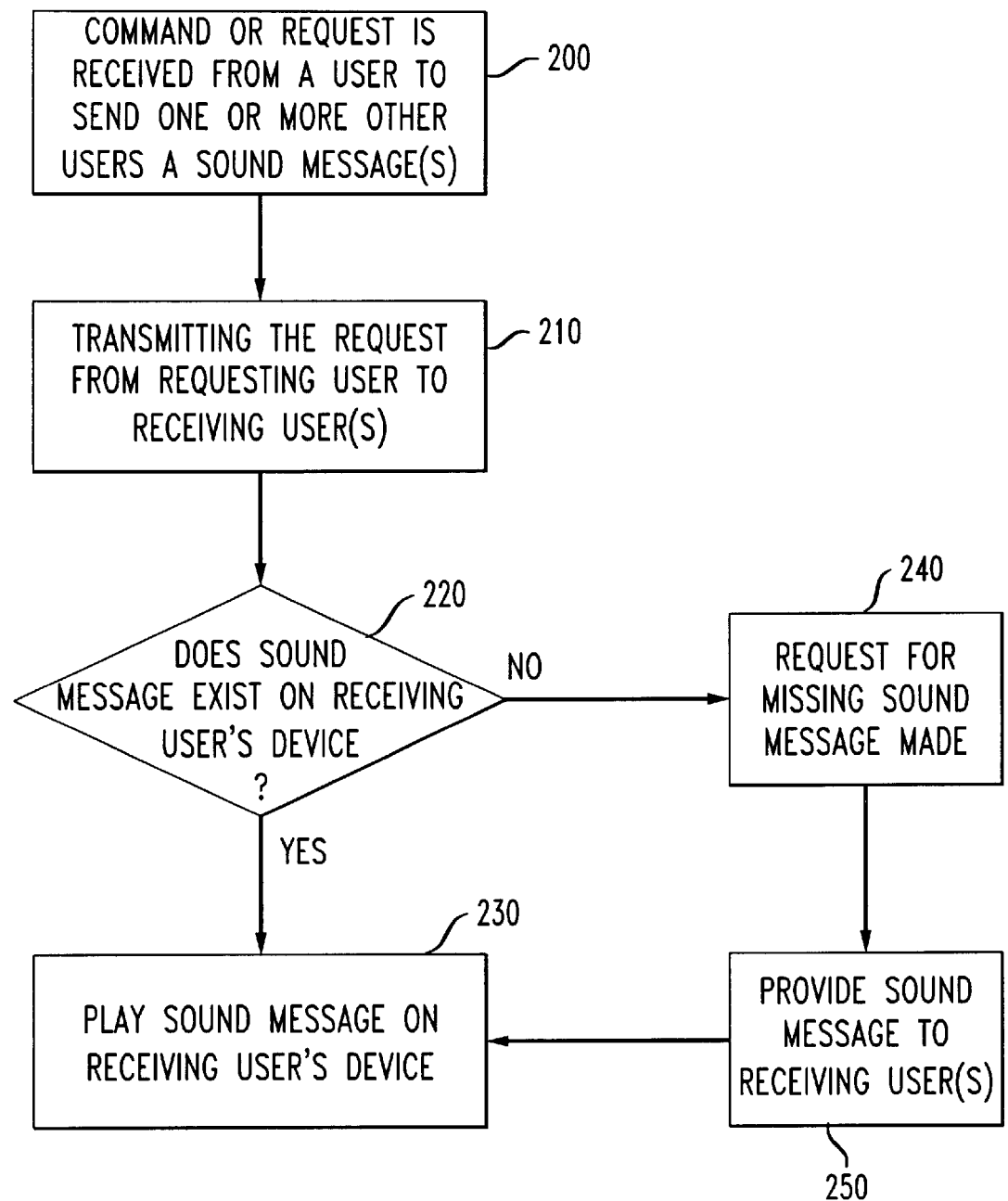
FIG. 5 is another exemplary method in accordance with the teachings of the present invention.

Referring to FIG. 5, an exemplary method for facilitating communications in accordance with the present invention is shown. In this embodiment, a command or request is received from a user to send one or more users a sound message(s) or earcon(s), step 200. In its most basic form, a user request identifies the user or users to which the sound message is intended for, and a unique identifier or ID of the sound message to be played. As discussed above, the request may be simply the user selecting one or more names on the user's display screen and activating the icon associated with the sound messages the user wishes to send. Alternatively, the request may also include the requesting user's personal sound identifier as discussed earlier herein. The request will be transmitted to the receiving user's device, step 210. Once the request is received, it is determined if the sound message exists on the receiving user's device, step 220.

As discussed earlier herein, each user's device in the system will preferably have a locally cached or stored selection of sound messages or earcons created by other users in the system such that when one user sends another user a sound message, the sound will simply be played from the selection of locally resident sound messages. Thus, a determination if a sound message exists on the receiving user's device may be accomplished by comparing the unique identifier of the sound message contained in the request with the unique identifiers of the sound messages already existing on the receiving user's device. If a sound message does not exist on a user's device, a request for the missing sound message is made, step 240. Ideally, specialized software on the receiving user's device will automatically administer the request for a missing sound message. The missing sound message may either be requested directly from the requesting user or from a central server which may maintain a current selection of sound messages. The missing sound message is then provided to the receiving user, step 250. The message can then be played on the receiving user's device, step 230.

In one embodiment of the present invention, the sound message request includes the requesting user's personal sound identifier or at least some indication as to the identity of the user sending the request. Thus, the receiving user(s) device will play the personal sound identifier along with playing the sound message. In one embodiment, each user's personal sound identifier may be distributed to other users in the system similar to the manner in which sound message sound files are distributed to users in the system and stored on their local devices. The actual personal sound identifier may also be simply transmitted along with the request as discussed above. In this embodiment, a receiving user would receive the personal sound identifier along with the request to play a certain sound message. The personal sound identifier would be played along with the stored sound message.

In another embodiment of the present invention, the playing of a user's personal sound identifier may be performed automatically by each user's device. The user's device would play a user's personal sound identifier whenever a sound message is received from that specific user. In this manner, specialized software provided on the device will determine which user has sent a sound message and then play that user's respective personal sound identifier.

In one exemplary implementation of the present invention, PDA clients will communicate with one other and the server via a Cellular Digital Packet Data (CDPD) service such as AT&T's Pocketnet CDPD service using a Palm Vx, a Palm V, a Palm III, a Palm IIIx or other similar variations, updates or descendents thereof. These PDA devices may be equipped with a Novatel Wireless Minstrel V modem or other similar component. Client software development will be in C, via the freely available GNU/Palm SDK environment. A Win32 client implementation for desktop clients may be used that will also send and receive presence information and have the required sound support, etc. In a wireless telephone implementation, an HDML-based version of the client may be used, through a separate set of server functionality.

In one embodiment of the present invention, the sound message communications will support message authentication, and optional message encryption. In one embodiment, authentication will likely be accomplished by including an MD5(message+recipient-assigned-token) MAC with the message. A Tiny Encryption Algorithm (TEA) for the encryption layer may also be used in one exemplary embodiment. Of course other authentication and encryption algorithms may be used.

In the present invention, each unique device such as a PDA, wireless telephone or personal computer is associated with a single user. However, at times a single user may be active on two or more devices, such that a user may communicate via the sound messages with users via the two or more devices. For example, a single user may be in communication via their PDA as well as their wireless telephone at the same time. In this manner, a display screen such as the one shown in FIGS. 1, 2 and 4 may provide some indication that the user is on multiple devices at the same time. For example, some type of visual indicator such as a representative icon may be displayed next to the user's name to show that the user is on both their PDA and wireless telephone device simultaneously. In such an embodiment, a request or command to play a sound message will be sent to the user's device on which the user is currently active.

In the present invention, a potentially unlimited variety of communication scenarios are possible using the sound messages of the present invention, such an exemplary ritualized conversations is displayed below between a number of exemplary users where the users are exchanging a series of communicative earcons with one another:

Ann: <Earcon for "Hi!"> Bonnie: <Earcon for "Lunch?"> George: <Earcon for "Ready?">

Nancy: <Earcon for "Hi!"> Dipti: <Earcon for "Sure!"> Maya: <Earcon for "In 5">.

In this manner, users can quickly contact each other and make arrangements or just let each other know they're thinking about each other without requiring undue amounts of keystrokes, actions or input on the part of the users. Personal sound identifiers or sound identification may also be used herein to identify users to one another on the system. As discussed earlier herein, personal sound identifiers are unique abbreviated sounds which associated with specific users. For example, in the above illustrative communication, user "Ann" may have a personal sound identifier which resembles a portion of the "Hawaii-Five-O" theme song, user "Bonnie" may have a random three note melody as a personal sound identifier and user "Dipti" may have a personal sound identifier which resembles a portion of the famous song "Smoke on the Water". Thus, if user "Ann" were to send user "Bonnie" an earcon, the earcon would be preceded by the short snippet from the "Hawaii Five-O" theme song followed by the earcon to signal user "Bonnie" that the earcon was from "Ann." In conversing via the earcons, users may selectively accept and reject earcons from certain users or all users as desired. For example, user "Ann" may configure her device to accept earcons from all users, specific users such as "Bonnie" and "Dipti" or alternatively, not accept any earcons from any user. Such a configuration may be provided via specialized software on the user's respective device which allows the setting of these possible configurations.

In the present invention, only those users who have indicated a willingness or provided the necessary permission to receive such sound messages will receive such sound message. In one further exemplary scenario, exemplary USER X, USER Y and USER Z would allow each others sound messages to be propagated to one another such that USER X, USER Y and USER Z each would have a complete set of locally stored sound messages selected/created by the other users. For example, USER X would have locally saved versions of all the sound messages selected/created by USER Y and USER Z and so on.

It will be apparent to those skilled in the art that many changes and substitutions can be made to the system and method described herein without departing from the spirit and scope of the invention as defined by the appended claims.

We claim:

1. A method of establishing sound based communications among a plurality of distributed users in a communicative network, comprising:

storing one or more sound communication files, each sound communication file being comprised of a series of notes;

receiving a request from at least one user on the network, wherein the request identifies one or more other users in the network and at least one sound communication file designated for the one or more identified users; and transmitting the user's request to the one or more identified users in the network, wherein in response to the request, the at least one sound communication file is played, the at least one communication file having an associated conversational meaning which is recognizable by the one or more identified users in the network.

2. The method of claim 1, further comprising:

playing a personal sound identifier for the one or more identified users in the network, the personal sound identifier identifying the requesting user to the one or more identified users in the network.

3. The method of claim 1, wherein each sound communication file is preceded by a personal sound identifier, the personal sound identifier being comprised of a short snippet of notes.

4. The method of claim 1, further comprising:

requesting for transmission of the at least one sound communication file if the sound communication file identified in the request is not already stored.

5. The method of claim 1, wherein each sound communication file is associated with a visual icon.

6. The method of claim 1, wherein the request is transmitted via a UDP protocol.

7. The method of claim 1, wherein the sound communication file is saved in one of a MIDI file format, a .MP3 file format, a .WAV file format, a .RAM file format, a .AAC file format and a .AU file format.

8. An apparatus for facilitating exchange of sound messages between a plurality of remote users, the apparatus comprising:

a display screen;

at least one icon displayed on the display screen, the at least one visual icon associated with an earcon, wherein when the icon is selected a command to play the earcon is transmitted to one or more other remote users; and a receiving component for receiving a command to play earcons, wherein the receiving component includes a speaker component.

9. The apparatus of claim 8, wherein the earcon is a short string of notes which connote a message to the one or more other remote users.

10. The apparatus of claim 8, wherein the earcon is accompanied by a personal sound identifier which identifies the user which transmitted the command to play the earcon.

11. The apparatus of claim 8, wherein each earcon is identified by a unique ID.

12. The apparatus of claim 11, wherein the command to play the earcon includes the earcon's unique ID.

13. The apparatus of claim 8, wherein the earcon is selected from a plurality of existing sounds.

14. The apparatus of claim 8, wherein the earcon is newly created by a user.

15. The apparatus of claim 8, wherein each earcon is accompanied by a personal sound identifier which may be one of a short song riff or a string of notes.

16. A method of facilitating sound based communications among a plurality of distributed users, comprising:

distributing a plurality of sound messages for storage by each of the plurality of distributed users;

receiving a request from one or more of the distributed users to play a designated sound message to one or more other distributed users;

transmitting the request to the one or more other distributed users to play the designated sound message; and receiving a newly created message from one or more of the plurality of distributed users.

17. The method of claim 16, wherein the newly created message is distributed for storage by each of the plurality of distributed users.

18. A method of facilitating sound based communications among a plurality of distributed users, comprising:

distributing a plurality of sound messages for storage by each of the plurality of distributed users;

receiving a request from one or more of the distributed users to play a designated sound message to one or more other distributed users;

transmitting the request to the one or more other distributed users to play the designated sound message;

wherein a request identifies the names of one or more of the distributed users.

19. A method for communicating via a plurality of sound instant messages, the method comprising:

receiving the plurality of sound instant messages;

caching the plurality of sound instant messages;

receiving a request to play at least one of the cached sound instant messages; and playing the at least one of the cached sound instant messages from the plurality of stored sound instant messages;

wherein the sound instant message is in MIDI file format.

20. A method for communicating via a plurality of sound instant messages, the method comprising:

receiving the plurality of sound instant messages;

caching the plurality of sound instant messages;

receiving a request to play at least one of the cached sound instant messages; and playing the at least one of the cached sound instant messages from the plurality of stored sound instant messages;

wherein if the request identifies a sound instant message which is not one of the cached sound instant message, the sound instant message which is not one of the stored sound instant messages is requested for caching.

21. A method for communicating via a plurality of sound instant messages, the method comprising:

receiving the plurality of sound instant messages;

caching the plurality of sound instant messages;

receiving a request to play at least one of the cached sound instant messages; and playing the at least one of the cached sound instant messages from the plurality of stored sound instant messages;

wherein the sound instant message is accompanied by a personal sound identifier which identifies a unique user.

22. A system for facilitating sound based communications, comprising:

a plurality of distributed communicative devices;

a plurality of sound instant messages for playing on each of the distributed communicative devices; and a central server which receives a request from one or more of the plurality of distributed communicative devices, transmits the request to one or more of the plurality of distributed communicative devices identified in the request wherein the one or more of the plurality of distributed communicative devices identified in the request will play one or more of the plurality of sound instant messages also identified in the request.

23. A method for providing communications via sound instant messages, the method comprising:

receiving a plurality of sound instant messages from a plurality of users in a network;

distributing the plurality of sound instant messages to each of the plurality of users in the network so that each user in the network has a common set of sound instant messages;

receiving a selection action from at least one of the plurality of users, the selection action identifying at least one other user in the network and at least one sound instant message designated for the at least one other user; and providing a signal to the designated user, wherein in response to the signal, the at least one sound instant message is played by the designated user, the at least one sound instant message having an associated conversational meaning known to the users.

* * * * *